July 15, 1969   C. R. SCHOFIELD   3,455,177
VARIABLE-RATIO FRICTIONAL DRIVE GEARS
Filed July 20, 1967   2 Sheets-Sheet 1
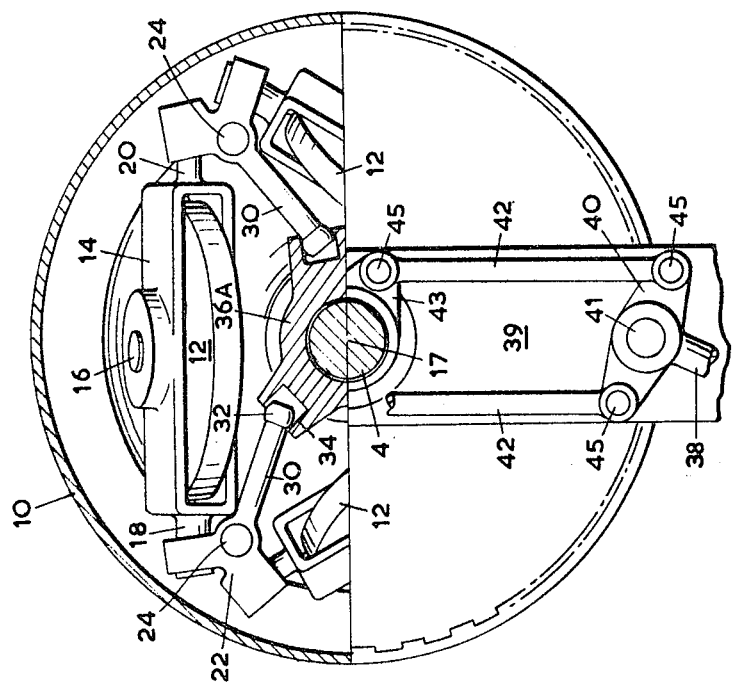
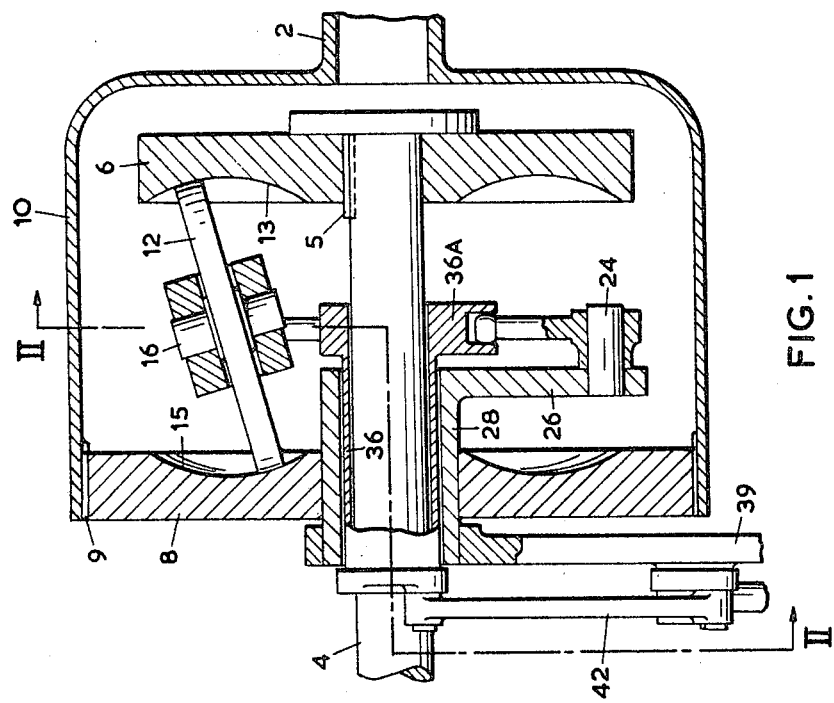
INVENTOR
Clifford Raymond Schofield
BY
    Misegades & Douglas
        ATTORNEYS

United States Patent Office 3,455,177
Patented July 15, 1969

3,455,177
VARIABLE-RATIO FRICTIONAL DRIVE GEARS
Clifford Raymond Schofield, Bradford, England, assignor to The English Electric Company Limited, London, England, a British company
Filed July 20, 1967, Ser. No. 654,731
Claims priority, application Great Britain, July 20, 1966, 32,537/66; Sept. 30, 1966, 43,800/66
Int. Cl. F16h *15/50*
U.S. Cl. 74—200                                    10 Claims

ABSTRACT OF THE DISCLOSURE

This invention is concerned with variable-ratio frictional drive gears comprising two axially spaced torus discs with toroidal surfaces engaged by drive rollers mounted in roller carriages carried by rocker members by which the roller carriages can be moved circumferentially to vary the drive ratio of the gear, one end of each roller carriage being slidably connected to the co-operating rocker and incorporating a damper resisting sliding motion. The main purpose of the dampers is to damp out any out of phase oscillation of the rollers which might occur during use.

---

This invention is concerned with variable-ratio frictional drive gears of the kind comprising basically two axially spaced torus discs between which there is a set of circumferentially spaced drive rollers in frictional rolling contact with toroidal surfaces on the discs, each roller being rotatably mounted in a roller carriage which can tilt about an axis at right angles to the axis of rotation of the roller so as to vary the distances from the gear axis at which the roller engages respectively the two discs, thus varying the drive ratio of the gear. The angle of tilt of the roller carriages, as it controls the drive ratio of the gear, is called the "ratio angle."

One way of changing the ratio angle is to tilt the roller carriages by means of a positive mechanical linkage. This invention is however concerned with an alternative arrangement in which this control is achieved indirectly by bodily moving the roller carriages in substantial circumferential directions with respect to the gear axis, and by allowing the rollers then to steer themselves towards a different ratio angle.

This invention is particularly though not exclusively concerned with gears in which the plane of each roller, normal to the axis of rotation of the roller and passing through the points of contact of the roller with the two opposed torus discs, contains the axis about which the roller tilts, being tangential to the torus centre circle (i.e. the locus of the centre of the circle revolved to generate the torus), as distinct from gears in which the same plane for each roller is closer to the main axis of rotation of the gear. The first arrangement, to which this invention is particularly applicable, has its rollers lying diametrically across the torus circle (and may accordingly be referred to as a "diametrical-roller gear") as opposed to the second arrangement, which has chordal rollers of smaller diameter than the torus circle.

A gear according to this invention comprises two axially spaced torus discs between which there is a set of circumferentially spaced drive rollers in frictional rolling contact with toroidal surfaces on the discs, each roller being rotatably mounted in a roller carriage having end portions which lie on a tilt axis at right angles to the axis of rotation of the roller and which are pivotally connected to rocker members pivoted to a stationary member about axes substantially parallel to the axis of the gear so that pivotal movement of the rocker members during use produces substantially circumferential movement of the roller carriages and a consequent ratio change movement of the rollers about the tilt axis, each rocker member being connected to the adjacent end portions of two adjacent roller carriages, one connection for each roller carriage being arranged to permit relative sliding between the roller carriage and the rocker member in the direction of the tilt axis and including a damper which resists relative sliding oscillation between the roller carriage and the rocker member.

The damping prevents or retards any tendency for out-of-phase oscillation of the different rollers. Such oscillation can occur in the absence of suitable damping and can drastically increase the rate at which a gear deteriorates during use. There are other ways of damping oscillation which have been used in the past, but they are not convenient to apply, for example, to a gear having only one set of rollers, as distinct from gears which have two axially spaced sets of rollers driving between three torus discs and in which there is more space available for other damping arrangements. The form of damping according to this invention, that is to say in the sliding connections between the roller carriages and the rocker members, is however applicable usefully to gears with more than one set of rollers.

The rocker members preferably have arms extending radially inwardly to a control sleeve which is in engagement with the inner ends of the arms and can be partially rotated about the axis of the gear to produce the pivotal movement of the rocker members necessary for controlling the ratio angle of the gear.

Examples of gears according to this invention are shown in the accompanying diagrammatic drawings. In these drawings:

FIG. 1 is a longitudinal section through one gear;

FIG. 2 is a partly sectioned end view on the line II—II in FIG. 1;

Figure 3:
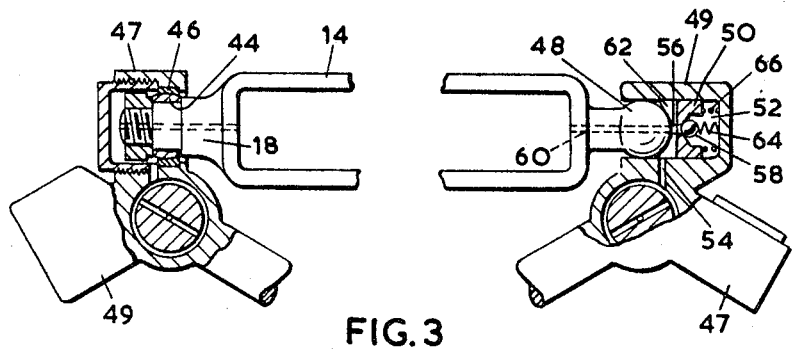
FIG. 3 is a partly sectioned and enlarged fragmentary view showing the mounting of one roller carriage.

The gear shown in FIGS. 1 and 2 has shafts 2 and 4 of which either can serve as the input with the other serving as the output. Two torus discs 6 and 8 are mounted on the shaft 4, the disc 6 being secured to the shaft 4 by a spline 5 while the disc 8 is secured by a spline 9 in a drum 10 connected to the shaft 2.

The gear has a set of three diametrical rollers 12 engaging toroidal surfaces 13 and 15 on the discs. Means (not shown) are included for urging the disc 8 towards the disc 6 so as to create the necessary reaction by which rollers 12 can transmit a frictional drive between the two discs.

As shown in FIG. 2, the rollers are arranged symmetrically at 120° intervals around the gear axis 17. Each roller 12 is carried by a roller carriage 14 and can rotate on a pin 16. A change in the ratio angle of the rollers is brought about by tilting of the roller carriages about an axis passing through end portions 18 and 20 of the roller carriages.

The roller carriages are themselves carried by three similar rocker members 22. Each rocker member is pivoted by means of a pin 24 to a stationary spider member 26 and has an inwardly directed arm 30. A part-spherical enlargement 32 on the inner end of each rocker arm 30 seats in a recess 34 of circular cross-section in a flange 36A on a control sleeve 36; alternatively the recesses 34 may be axial grooves. A slight angular displacement of the control sleeve results in swinging of the rockers about their pins 24, and this in turn results in substantially circumferential movements of the roller carriages. Movement of the sleeve 36 is controllable externally by means of a lever 38 connected to the sleeve 36 via a bell crank 40, parallel links 42 and lugs 43 on the sleeve 36. The links are pivotally connected to the bellcrank 40 and lugs 43 by pins 45. The bellcrank is pivoted to a stationary member 39 by a pin 41.

It will be seen that there is radial clearance between the sleeve 36 and the shaft 4, and between the sleeve 36 and the surrounding member 28. This enables the sleeve 36 to float to a limited extent so as to allow the rollers freedom to equalise the load between themselves. To make this possible, the control sleeve is in practice controlled by complex linkage rather than by the simple bellcrank arrangement which is shown only for the purpose of diagrammatic illustration. Alternatively, the control sleeve may be controlled by two parallel hydraulic jacks pivotally connected to the lugs 43 at one end and to stationary pivots at the other end.

FIG. 3 shows how each roller carriage is pivotally connected to the rocker members by which it is carried. One end portion 18 of the roller carriage has a simple ball-and-socket connection formed by a part-spherical collar 44 on the roller carriage which can swivel in a complementary sleeve 46 in a socket portion 47 of the rocker member. The other end of the roller carriage has a ball-end portion 48 which is slidable in a cylindrical bore in a socket portion 49 of the other rocker member. Between the ball-end portion 48 and the bottom of the cylindrical bore there is a piston 50 which lies against the portion 48. Damping is achieved by supplying lubricating oil to the chamber 52 in the socket portion 45 via a passageway 54 in the rocker member and a hole 56 in the piston member. The inner mouth of the hole 56 serves as a seat for a non-return ball valve 58 which allows oil to flow through the hole 56 into the chamber 52 but not in the opposite direction.

Triangular ribs 62 on the piston hold the ball-end portion 48 of the roller carriage away from the position in which it would tend to obstruct the flow of oil through the passageway 56 and into the chamber 52.

It will be seen that damping of any sliding oscillation of any roller carriage with respect to the co-operating rocker socket 49 will occur during movement of the roller carriage into the bore in the socket since the non-return valve 58 prevents flow of oil out of the chamber 52 through the hole 56. During such inward movement, oil must squeeze round the piston. During outward movement, oil can flow through the hole 56 so as to keep the chamber 52 full of oil. The piston 50 is held against the portion 48 of the roller carriage by a spring 64 acting on the ball valve 58, and also by means of a further spring 66; the spring 66 may alternatively be omitted.

Oil delivered through the passageway 54 also serves to lubricate the roller, being squirted on to the roller through a bore 60 in the roller carriage.

Figure 4:
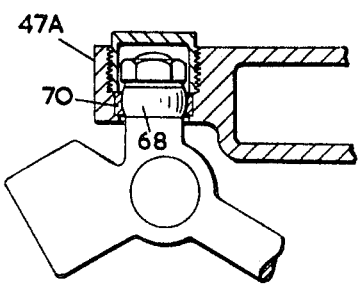
FIG. 4 shows an alternative construction for the mounting at one end of the roller carriage.

FIG. 4 shows an alternative non-slidable ball-and-socket connection which can replace the connection shown at the left-hand end of the roller carriage in FIG. 3. In this case the collar 68 with an external part-spherical surface is on the rocker, and a complementary sleeve 70 with an internal part-spherical surface is secured in a socket 47A in the roller carriage.

Figure 5:
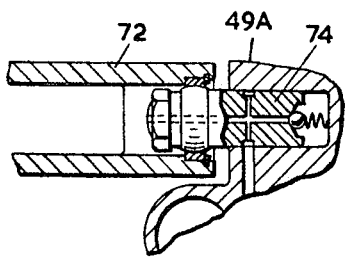
FIG. 5 shows an alternative construction for the mounting at the other end of the roller carriage.

FIG. 5 shows an alternative slidable damping connection which can replace the connection on the right-hand end of the roller carriage in FIG. 3. In this example, the roller carriage end portion 72 has a ball-and-socket connection with a piston member 74 slidably mounted in a rocker socket 49A. The damping action is the same as that provided by the arrangement shown in FIG. 3.

In a further modification of the damping connection, the roller carriage may have a spherical ball-end portion 48 (as shown in FIG. 3) seating in a part-spherical socket in a piston member formed basically like the piston member 74 in FIG. 5.

The hydraulic damping at each slidable connection may be replaced by other forms of damping, for example frictional damping. For example, in FIG. 3 the piston 50 may be omitted and the rocker socket 49 may contain a rubber sleeve in which the ball-end portion 48 is a tight sliding fit.

I claim:

1. A variable-ratio frictional drive gear comprising two axially spaced torus discs between which there is a set of circumferentially spaced drive rollers in frictional rolling contact with toroidal surfaces on the discs, each roller being rotataby mounted in a roller carriage having end portions which lie on a tilt axis at right angles to the axis of rotation of the roller and which are pivotally connected to rocker members pivoted to a stationary member about axes substantially parallel to the axis of the gear so that pivotal movement of the rocker members during use produces substantially circumferential movement of the roller carriages and a consequent ratio change movement of the rollers about the tilt axis, each rocker member being connected to the adjacent end portions of two adjacent roller carriages, one connection for each roller carriage being arranged to permit relative sliding between the roller carriage and the rocker member in the direction of the tilt axis and including a damper which resists relative sliding oscillation between the roller carriage and the rocker member.

2. A gear according to claim 1 in which the damper in the sliding connection at one end of each roller carriage is a hydraulic damper.

3. A gear according to claim 2 in which the damper in the sliding connection at one end of each roller carriage comprises a piston which is slidable in a socket portion of the corresponding rocker member and which defines with the rocker portion a chamber to which oil is delivered via a non-return valve preventing flow out of the chamber.

4. A gear according to claim 3 in which the oil is delivered through a hole in the piston.

5. A gear according to claim 4 in which the non-return valve is a spring-loaded ball valve in the chamber, seating against mouth of the hole in the piston.

6. A gear according to claim 4 in which the oil delivered to the chamber flows from a passageway delivering lubricating oil to the roller.

7. A gear according to claim 3 in which the end portion of the roller carriage adjacent to the piston is formed as a ball-end portion and is slidably located in the socket portion of the rocker member.

8. A gear according to claim 1 in which the non-slidable connection between each roller carriage and the corresponding rocker member is formed as a ball-and-socket joint.

9. A gear according to claim 1 in which the rocker members have arms extending radially inwardly to a control sleeve which is in engagement with the inner ends of the arms and can be partially rotated about the axis of the gear to produce the pivotal movement of the rocker members necessary for controlling the ratio angle of the gear.

10. A variable-ratio frictional drive gear comprising two axially spaced torus discs having mutually facing toroidal surfaces, and a set of circumferentially spaced drive rollers extending diametrically across the torus circle defining the toroidal surfaces of the torus discs, and in frictional rolling contact with the toroidal surfaces, each roller being rotatably mounted in a roller carriage having end portions which lie on a tilt axis at right angles to the axis of rotation of the roller and which are pivotally connected to rocker members pivoted to a stationary member about axes substantially parallel to the axis of the gear so that pivotal movement of the rocker members during use produces substantially circumferential movement of the roller carriages and a consequent ratio change movement of the rollers about the tilt axis, each rocker member being connected to the adjacent end portions of two adjacent roller carriages, and having a radially inwardly directed arm pivotally engaging a control sleeve for controlling the ratio angle of the rollers, one connection for each roller carriage being formed by a piston which is universally connected to the roller carriage and is slidable in a socket in the rocker member, and including means for delivering fluid via a non-return valve to a chamber defined by the bottom of the socket and by the piston, whereby sliding oscillation of the piston in the socket is damped.

References Cited

UNITED STATES PATENTS

| | | | |
|---|---|---|---|
| 1,847,553 | 3/1932 | Pew | 74—200 XR |
| 3,203,267 | 8/1965 | Perry et al. | 74—200 |
| 3,267,756 | 8/1966 | Perry et al. | 74—200 |
| 3,306,119 | 2/1967 | Perry et al. | 74—200 |
| 3,345,882 | 10/1967 | Armstrong | 74—200 |

FRED C. MATTERN, JR., Primary Examiner

J. A. WONG, Assistant Examiner